2,952,548
PROTOPECTIN COMPOSITION AND METHOD OF PREPARATION

Lincoln T. Work, 36 W. 44th St., Maplewood, N.J.

No Drawing. Filed Oct. 5, 1956, Ser. No. 614,081

6 Claims. (Cl. 99—90)

This invention relates to an improved pectinous composition and to an improvement in processing such water sensitive organic components for use in food products and, in particular, to the preperation of pectinous materials, such as protopectin, to delay their absorption of water, thereby to permit a comfortable time margin for the handling and mixing of these materials as components of products prior to their being cooked.

The beneficial values of protopectin as a food component have been known for a long time. When protopectin is consumed, after it has been dispersed with saliva, it swells in the stomach thereby giving a feeling of satiety and encourages the practice of self-control in eating. In the digestive tract protopectin breaks down into pectins, pepsins and fibrous materials to form a hemi cellulosic mass, which serves to give intestinal regularity without the deleterious effects of laxatives. It furnishes roughage in the intestinal tract and, in so doing, serves as a regulator. When consumed in capsules, however, it does not disperse easily and becomes a gummy coated ball in the stomach and its water absorbing action becomes too slow to give an optimum degree of benefit as an aid in reducing.

When blended into pastries, cookies, crackers, bread or baked products generally it would do better, but its rapid absorption of water leads to hardening even before the wet mixes can be shaped and baked, so that resultant products, if they have a useful protopectin content, are too hard to be palatable. By limiting the protopectin content of baked goods as well as limiting the time of mixing and also by using low gluten flour, it is possible to prepare reasonably palatable pastry products. However, it is necessary to reduce protopectin to such low levels that effective dosage as an intestinal regulator cannot be achieved without excessive consumption of the pastry product.

In commercial baking operations limitation on time of mixing it not an adequate answer to the problem of too rapid water absorption, because a slightly prolonged mixing or minor labor delay during operations will permit the wet mixes which have been made to harden and be rendered unfit for shaping or baking.

It is most desirable to distribute protopectin in the dry flour used in a baking mix and in the formulations to measure it and consider it a part of the flour. This distribution of the protopectin is most desirable because it makes the protopectin most available for its water absorption function.

It is, accordingly, a basic object of this invention to provide a preliminary process for treatment of protopectin which will put it in a form which will give it an adequate holding time against absorption of water in the mixing and kneading operations preliminary to baking, whereby it becomes possible to formulate commercial dry mixes with this modified protopectin composition.

It is another object of the invention to provide a modified protopectin composition suitable for use in dry mixes with flour of any kind, i.e., without regard to gluten content.

It is another object of the invention to provide a protopectin mixture which will be water resistant over a long shelf life as a dry mix.

It is a further object of the invention to provide a protopectin composition which has a controlled resistance to water absorption and attains this resistance without the use of large amounts of fat.

Other objects and advantages of the invention will in part be obvious and in part appear hereinafter.

The invention is embodied in a protopectin composition blended with a water resistant edible material so that the resultant blend is a product which has substantial resistance to water absorption, but is compatible with water to a degree sufficient to avoid segregation of the protopectin in the baking mix. The coating also is such that it is modified in cooking by chemical reaction in the mix or by melting and diffusion into the mix so that the protopectin, in the process of cooking, is converted back into a physical form which develops substantially optimum water absorbing behavior when it is consumed and enters the stomach and intestinal tract.

The protopectin product, accordingly, is characterized by the fact that the fine particles are individually coated with a water repellant protective blend and may be coalesced somewhat coarsely, but not to a granular form, the coating being sufficiently light to make the protopectin a free-flowing, non-dusting powder which is readily usable in such favorable form by the baking and dry mix trades. The method of the invention consists of the process of preparing a mixture of a shortening edible oil prepared with a waterproof or water repellant material, such as paraffin, microcrystalline wax, a mixture of the two or other edible resinous materials, to form a mix which is then rubbed in the protopectin particles to coat them with the waterproof material.

Skins of citrus fruits are the major source of protopectin. It is prepared by extracting oils and other flavor producing and water soluble components of the skins, drying them and reducing them to a powder. Relatively crude protopectin will serve the purposes of the invention for it is the water absorption capacity without the soluble or flavoring components which is utilized in this invention.

A common form of protopectin quite satisfactory for use in accordance with the present invention is a white powder, very finely divided, generally of about 40 to 60 mesh average size. One gram of dry protopectin of this form will absorb 10 to 25 milliliters of water at pH 5.9, within 30 minutes. If the protopectin as obtained commercially does not swell easily or absorb water quickly, it may be due to the fact that the individual particles have been so treated during manufacture as to harden and seal off pores at the surfaces of the particles, thereby to render them resistant to the entry of water. Such a protopectin may be ground further to expose porous interiors of particles to the entry of water.

The use of the dry protopectin, as such, in a simple baking mix which includes a certain proportion of water will lead to swelling and development of adhesiveness to form a tough doughy mix. It is most desirable to avoid having the dough become too tough and rubbery, because the result, after baking, will be very hard and cementitious.

Also, it is important that a substantial proportion of the water absorbing capacity of the protopectin be available for absorption of water and swelling after it reaches the stomach, because at least part of the utility of the protopectin as a component of food resides in the fact that it is of small volume, but very large volume when it is fully saturated with water or with the juices of the stomach. The pH level of stomach fluids is generally from 5.9–6.2.

It is feasible to limit mixing time or to proportion the mixing time to the rate at which the protopectin will absorb water, and thus conserve part of its aqueous absorbing capacity for saturation in the stomach. In preparing mixtures for baking, the addition of the protopectin may be closely timed to be the last step completed just prior to the baking operation itself.

Where attention is being given to the formulation of baking mixes of low caloric value for the diet conscious, any low calorie sweetening agent, such as saccharin may be used.

As a specific example of the preparation of the modified protopectin composition useful for direct incorporation into baking mixes following fundamentally conventional baking practice, I have found that water penetration into protopectin can be controlled by coating its surface with a waterproofing agent and, preferably, coating the surface of the protopectin particles with a waterproofing agent from a solvent, from an oil cream, or from a water emulsion. The waterproofing materials may be paraffin, microcrystalline wax, shellac, or an insoluble metal salt, such as calcium stearate.

As a typical example of a coating, the following may be given:

EXAMPLE I

Twenty parts by weight of paraffin wax are heated with 100 parts by weight of a food grade soy bean oil, until a homogeneous miscible melt is obtained. Generally, it will be found that it is not necessary to heat the mix more than a few degrees higher than the melting temperature of the paraffin wax. With mixing, a homogeneous melt is very quickly formed. The melt is then quickly cooled, with rapid stirring, to ambient temperature, with the result that the wax precipitates as very fine grain crystals suspended in the oil medium.

This formulation, consisting of 20 parts of the paraffin in 100 parts of the oil, has a soft creamy body which maintains a uniform texture in that the crystals do not settle out. If the proportion of wax is raised to 25 to 30 parts or more, the cream becomes quite stiff and is not as convenient to handle as that containing the smaller proportion of paraffin.

On the other hand, if the proportion of wax is reduced to 15 to 10 parts by weight, or less, the resulting cream is useful, but is somewhat thin for convenient handling. The degree of stiffness of the cream desired for use in the blending with the protopectin is that it be soft so that the effort required in the mixing is small.

Directly similar creams are made from corresponding proportions of microcrystalline wax, any mixture of paraffin and microcrystalline wax, and olive, corn, rapeseed, linseed, lard, cottonseed oil and similar animal and vegetable fats directly substituted into the formulation described above. Shellac is a typical natural edible gum which may be used and it may be dispersed in the oil directly as in the example, or mixed with it in alcohol solution.

Insoluble soaps, such as calcium stearate or calcium oleate, may be dispersed in the oil also to form a cream. The essential requirement is that the waterproof material, be it wax, gum, or calcium soap, be edible, even though it may not be very platable. Also that it have a melting point which leaves it solid at ambient temperature but melts at boiling temperature, i.e., a melting point in the range from about 100° F. to about 350° F. Preference, of course, is for the bland tasting materials so that no strange flavor is introduced into the ultimate baked product.

In coating the protopectin to convert it from a dry dusty powder, which too quickly absorbs water, about 10 parts by weight of the preferred cream mix, as in Example I, are used with 100 parts by weight of the protopectin. In any baking formulation the cream may be considered part of the shortening.

Smaller amounts of the cream, that is, 3 or 4 parts by weight, or less, per 100 parts, by weight, of protopectin, it will be found, do not quite adequately coat the particles; about 4 percent is needed to coat the particles adequately and substantially more, that is, 20 parts, by weight, or more, will cause the protopectin to be converted to a greasy mass. The most useful proportion of cream to protopectin will be within this range, but precise amounts will depend upon the properties of the protopectin.

Since the objective is to coat the particles superficially just sufficiently to interfere with water absorbtivity and yet leave the protopectin in the form of a free-flowing powder, minimum quantities of oil-waterproofing mix to accomplish the end result are indicated.

The coating of the protopectin with the shortening cream is accomplished by mechanically mixing in conventional mixing apparatus.

By close inspection of the protopectin coated with the oil-waterproofing blend it has been found that the oil penetrates the surface of the individual protopectin particles to a certain degree, but that the waterproofing agent filters out to form a film, substantially continuous, with an oil matrix on the surface of the protopectin particles. The protopectin particles so coated have a powdery slippery quality induced by the formation of this waterproof surface, which is very desirable in making a pastry mix. Particularly is this true in the formulation of dry mixes.

In the preparation of the cream any edible oil which preferably has shortening properties may be used.

Other edible natural waxes and gums may also be employed. Thus microcrystalline wax and mixtures of microcrystalline wax with ordinary paraffin wax are quite useful. Similarly, other natural waxes such as beeswax or carnauba may be used. Paraffin waxes having relatively high melting points are to be preferred and also generally those having low oil solubility are desirable.

Since it is the physical mixture of the waterproofing wax or resin in the edible oil which it is desired to use, and the object to be accomplished is superficial impregnation of the protopectin with the oil with resultant coating of the particle surface, variations in the cream formula can be worked out on the basis of experience.

Also in the accomplishment of this surface waterproofing of the protopectin particles alcoholic solutions of shellac or edible hydrophobic gum or wax are useful. In such instances the solvent is the penetrant medium and the precipitated wax or colloidal gum forms a surface layer over the protopectin particles.

The following example indicates how shellac may be used:

EXAMPLE II

Food grade shellac is dissolved in ethyl alcohol to a concentration of about 2–4 pounds per gallon. Commercial protopectin is then rapidly agitated, in a screw mixer for example, and while it is being agitated it is sprayed with the shellac solution using a very fine spray. The object is, of course, to obtain maximum surface distribution of the shellac on the protopectin. The amount of shellac is kept to a level of 3–4 parts per 100 parts of protopectin.

In general, because the use of shellac involves drying the product and disposing of alcohol vapors, the waterproofing mixtures using an edible oil as a carrier are to be preferred.

Comparison of a baking mix using untreated protopectin in a formulation for a baked product may be gained from the following:

Cookie mix

| Ingredient: | Parts by weight |
|---|---|
| Low gluten flour (e.g. winter wheat) | 100 |
| Shortening | 35 |
| Sugar | 60 |
| Egg (fresh) | 12 |
| Bicarbonate, sodium | 4–6 |
| Water | 55 |
| Protopectin (40–60 mesh) | 10 |
| Flavor. | |

With the protopectin of conventional form this mix must be made and shaped in a comparatively short period of time, and baked within a few minutes after the water is added, to avoid having the protopectin become too cementitious thereby to render the baked product too hard to be palatable or even edible.

The same formulation made up by utilizing protopectin made in accordance with Example I or Example II may be mixed and allowed to stand wet for several hours with no signs of being converted to the hard solid mass.

Baked goods formulations utilizing the treated protopectin of this invention may be made up with ordinary flour; i.e. no precaution need be taken to avoid flour having high gluten content.

Any baking formula may be prepared with protopectin which has been treated in accordance which has been treated in accordance with this invention. Because it has been effectively retarded in its water absorptivity conventional baking practices may be followed and formulas used, merely by treating the protopectin as part of the flour. Replacement of about 10 percent up to about 25 percent of the flour in a cookie, roll, or bread formula, with the treated protopectin, with no other change in proportions of ingredients results in an attractive product of good texture, flavor and general acceptability. Because of the high protopectin content it thus becomes possible to obtain the beneficial effects of the protopectin by consuming small quantities of such baked goods, all of which, of course, is consistent with the reducing diet sought.

If the treated protopectin content of the baked goods is increased beyond about ⅓ of the flour in the formula it may be too dominant in the product and result in its being bland.

In preparing the mix for a cookie, roll, or bread, using the treated protopectin of this invention, water absorptivity of the protopectin has been retarded sufficiently to permit the use of conventional mixing technique and scheduling. The protopectin does not make the mix too stiff. Baking dries the mix, of course, and at the same time melts the waterproofing matrix on the surface of the protopectin particles to make it part of the shortening in the product and thus the interior of the protopectin particles becomes exposed for water absorption, which occurs when the product is consumed.

By compressing the protopectin made in accordance with Examples I or II into pellets, useful reducing pills may be prepared. That is a given quantity of protopectin thus is made available for measured dosage and, consumed before a meal, will absorb water in the stomach and encourage the consumer to restrict his intake of food.

Also, by incorporating the treated protopectin into a candy mix, by replacing part of the sugar with it, the resulting candy will satisfy the consumer's desire for sweets, while at the same time encouraging control of intake.

Though the invention has been described with reference to only a limited number of examples, it is to be understood that variations thereof may be produced without departing from its spirit or scope.

What is claimed is:

1. A composition comprising a finely divided, dry protopectin, having the surface thereof coated with a hydrophobic composition, the said hydrophobic composition amounting to about 4 percent to not more than about 10 percent of the total weight of the protopectin, the composition being formulated with about 100 parts of an edible fatty oil selected from the group consisting of animal oils and vegetable oils, hydrogenated animal oils and hydrogenated vegetable oils, and about 10–30 parts of an edible waterproofing material selected from the group consisting of paraffin, microcrystalline wax, mixtures of paraffin and microcrystalline wax, edible natural waxes, shellac, and edible water insoluble calcium soaps.

2. A protopectin composition in accordance with claim 1 in which the proportion of paraffin in the coating material is about 15 parts by weight per 100 parts of oil.

3. A protopectin in accordance with claim 1 in which the waterproofing composition consists essentially of soy bean oil having dispersed therein about 10 parts to about 15 parts by weight of microcrystalline wax per 100 parts of oil.

4. A protopectin in accordance with claim 1 in which the waterproofing material is shellac.

5. The method of preparing a dry free flowing protopectin powder, suitable for use in the preparation of dry baked food compositions and similar dry food products, to make the said protopectin powder water resistant to an extent such that it will absorb little water during wet preparation of the baked food composition, the method comprising the steps of providing an edible fatty carrier blended with an edible waterproofing material suspended therein in finely divided form, blending the protopectin with about 4 percent to not over about 10 percent by weight of said carrier-waterproofing composition, thereby to coat the protopectin over its surface with said waterproofing material, and to render the protopectin particles resistant to the absorption of water to an extent such that when used in the preparation of dry food products, the protopectin will resist absorption of water for a period of time corresponding essentially to the period in which the food product is in a wet condition during that preparation, the said carrier-waterproofing composition corresponding to the following: about 100 parts of an edible fatty oil carrier selected from the group consisting of animal and vegetable oils, hydrogenated animal and vegetable oils, and about 10–30 parts of an edible waterproofing material selected from the group consisting of paraffin, microcrystalline wax, mixtures of paraffin and microcrystalline wax, edible natural waxes, shellac and edible water insoluble calcium soaps.

6. The method in accordance with claim 5 wherein the protopectin is coated with sufficient of said composition to render it resistant to the absorption of water.

References Cited in the file of this patent

UNITED STATES PATENTS

| | | |
|---|---|---|
| 738,702 | Scheinert | Sept. 8, 1903 |
| 1,827,794 | Leo | Oct. 20, 1931 |
| 2,043,204 | Spaulding | June 2, 1936 |
| 2,110,410 | Westby et al. | Mar. 8, 1938 |
| 2,145,016 | Spaulding | Jan. 24, 1939 |
| 2,412,282 | Nelson | Dec. 10, 1946 |

OTHER REFERENCES

"Pectin—Its Manufacture, Properties and Uses"; compiled by W. E. Elwell, published by Belle Reeves, Secretary of State (Washington), W.P.A. Project No. 2839, O.P. No. 665-93-3-126, January 1939, page 62 relied on.